US008557393B2

(12) United States Patent
Abraham et al.

(10) Patent No.: US 8,557,393 B2
(45) Date of Patent: Oct. 15, 2013

(54) ADHESIVE THERMOPLASTIC VULCANIZATES

(75) Inventors: Tonson Abraham, Strongsville, OH (US); Norman G. Barber, Norwalk, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1149 days.

(21) Appl. No.: 11/590,235

(22) Filed: Oct. 31, 2006

(65) Prior Publication Data

US 2008/0103244 A1    May 1, 2008

(51) Int. Cl.
*C08L 51/06* (2006.01)
*C08L 53/00* (2006.01)
*C08L 23/10* (2006.01)

(52) U.S. Cl.
USPC ........... 428/461; 524/432; 524/445; 524/502; 525/93; 525/192; 525/240

(58) Field of Classification Search
USPC ............ 525/192, 240, 93; 524/432, 445, 502, 524/504; 428/461
See application file for complete search history.

(56) References Cited

U.S. PATENT DOCUMENTS

| | | | |
|---|---|---|---|
| 4,607,074 A * | 8/1986 | Hazelton et al. ............... 524/425 |
| 4,957,968 A | 9/1990 | Adur et al. | |
| 5,051,474 A | 9/1991 | Warren et al. | |
| 5,609,962 A * | 3/1997 | Ouhadi ......................... 428/480 |
| 6,001,484 A * | 12/1999 | Horrion et al. ............. 428/425.1 |
| 6,497,337 B1 | 12/2002 | Kehe | |
| 2002/0018490 A1 | 2/2002 | Abrahamsson et al. | |
| 2002/0150776 A1 | 10/2002 | Imai et al. | |
| 2003/0119988 A1 * | 6/2003 | Johnson et al. ................ 525/191 |
| 2003/0232207 A1 * | 12/2003 | Thullen et al. ............. 428/476.3 |
| 2004/0097649 A1 * | 5/2004 | Willems et al. ............. 525/92 R |
| 2005/0131154 A1 | 6/2005 | Cai et al. | |
| 2005/0277735 A1 | 12/2005 | Abraham et al. | |
| 2006/0293454 A1 * | 12/2006 | Nadella et al. ................ 525/191 |

FOREIGN PATENT DOCUMENTS

| | | |
|---|---|---|
| EP | 0 269 275 | 6/1988 |
| JP | 2001-261504 | 9/2001 |
| JP | 2002-020562 | 1/2002 |
| JP | 2004-180945 | 7/2004 |
| WO | 99/55793 | 11/1999 |
| WO | 00/30851 | 6/2000 |
| WO | WO 00/37553 | 6/2000 |
| WO | 03/048263 | 6/2003 |
| WO | 03/106169 | 12/2003 |

* cited by examiner

*Primary Examiner* — Jeffrey Mullis

(57) ABSTRACT

In one or more embodiments of this invention, TPE compositions having between 55 and 85 Shore A hardness and having good adhesion to metal substrates, are produced by blending an amount of unsaturated carboxylic acid functionalized thermoplastic resin with a very soft TPV, namely, a TPV base having a hardness of 45 Shore A or less.

17 Claims, No Drawings

ADHESIVE THERMOPLASTIC VULCANIZATES

FIELD OF INVENTION

This invention relates to and discloses thermoplastic elastomer compositions having improved adhesion to metallic materials as substrates.

DESCRIPTION OF THE RELATED ART

Thermoplastic elastomers or vulcanizates ("TPEs" or "TPVs") are a fine dispersion of crosslinked rubber particles in a continuous phase of a thermoplastic, which is typically a polyolefin plastic. TPEs are traditionally made by blending a rubber with a semi-crystalline polyolefin plastic, often under conditions that allow for the dynamic vulcanization of the rubber. The result is a material comprised of a continuous thermoplastic phase interspersed with discrete, often crosslinked rubber particles, which form a rubber phase. TPEs have the benefit of the elastomeric properties provided by the rubber phase, with the processability of thermoplastics.

It is often desirable to overmold non-TPE substrates, including plastic and metal substrates, such as stainless steel and aluminum, with TPEs. It is also desirable to avert separation or delamination of the TPE from the underlying substrate.

Adhesion between TPEs and metal substrates is generally poor. Existing methods of improving TPE adherence to metal substrates involve pre-treating the substrate surfaces to improve adhesion or bonding. Pretreatment methods may include chemical treatments such as solvent etching, sulfuric acid or chromic acid etching, sodium treatment, ozone treatment, and physical treatments such as flame treatment, UV irradiation, and plasma treatment. These procedures are costly, use hazardous materials, result in product degradation, and create environmental hazards.

Other approaches to improving the adherence of TPEs to metal substrates include the use of adhesives and "mechanically" locking the TPE layer onto the substrate. The use of adhesives increases cost and production time. Mechanical approaches to improving adherence involve processing or specially forming the substrate, for example, by forming channels in the substrate into which the TPE can flow, solidify, and thereby lock the TPE layer in place the substrate. This requires specially designing the substrate, which may be undesirable or difficult.

It would be desirable to provide TPE compositions having good adhesion to metal substrates while maintaining a suitable balance of physical properties, including hardness, and processability. Specifically it would be desirable to provide TPEs having a hardness of between 55 and 75 Shore A for commercial applications

SUMMARY OF THE INVENTION

One aspect of the invention is directed to an adhesive thermoplastic elastomer composition comprising a very soft TPV possessing a hardness of less than 45 Shore A; and an unsaturated carboxylic acid functionalized thermoplastic resin selected from the group consisting of unsaturated carboxylic acid grafted $C_2$ to $C_4$ α-olefin homopolymers, unsaturated carboxylic acid grafted $C_2$ to $C_{20}$ α-olefin copolymers, copolymers of $C_2$ to $C_4$ α-olefins and unsaturated carboxylic acid, and blends thereof.

Another aspect of the invention is directed to an adhesive thermoplastic elastomer composition comprising:
(a) from 60 to 80 weight percent of a very soft TPV comprising
  (i) from 2 to 10 weight percent, based upon total very soft TPV of a thermoplastic resin;
  (ii) from 2 to 50 weight percent, based upon total soft TPV of a thermoplastic propylene/ethylene random or block copolymer;
  (iii) from 45 to 96 weight percent, based upon total soft TPV of a cross-linked elastomer; and
  (iv) from 100 to 225 phr of process oil; and
(b) from 40 to 20 weight percent of an unsaturated carboxylic acid functionalized thermoplastic resin based on the weight of the thermoplastic elastomer composition, wherein the thermoplastic resin of the unsaturated carboxylic acid functionalized thermoplastic resin is a thermoplastic polyolefin resin, and, wherein the unsaturated carboxylic acid is acrylic acid or methacrylic acid.

Yet another aspect of the invention is directed to an article formed by adhering adhesive thermoplastic elastomer composition and a metal substrate to one another.

DETAILED DESCRIPTION OF THE INVENTION

One or more embodiments of the invention includes thermoplastic elastomer ("TPE") compositions having a hardness of between 55 and 85 Shore A and having good adhesion to metal substrates, without the need of substrate pretreatment. The adhesive TPV compositions are produced by blending an unsaturated carboxylic acid functionalized thermoplastic resin with a very soft thermoplastic vulcanizate ("TPV"), that is, a TPV having a hardness of 45 Shore A or less, preferably less than 40 Shore A.

Exemplary "very soft TPVs" are described in European Patent No. EP 0 757 077-A1, U.S. Patent Publication No. 2005/0277735 A1, U.S. Patent Publication No. 2005/0277738 A1, and EP 0 892 831-B1 all of which are incorporated herein by reference for the purpose of describing the methods and compositions for the formation of very soft TPVs having a hardness of 45 Shore A or less.

In one embodiment, the very soft TPV comprises from 2-10 weight percent, based upon total weight of the very soft TPV, of a thermoplastic polyethylene, polypropylene homopolymer, or ethylene-propylene copolymer, or a copolymer that includes ethylene or propylene together with one or more C4 to C20 α-olefins, said thermoplastic having at least 25% crystallinity by DSC; from 15 to 36 weight percent, based upon total polymer content weight in the very soft TPV of a propylene/ethylene random or block copolymer thermoplastic having less than 5% crystallinity by DSC; from 60 to 80 weight percent, based upon total polymer content weight in the very soft TPV of a cross-linked elastomer; and from 100 to 225 phr of a process oil or blend of process oils.

The thermoplastic polyethylene or polypropylene of the very soft TPV, when present, can be selected from crystalline thermoplastic polyolefin resins such as polyethylene and polypropylene, as homopolymers, and also copolymers of ethylene and propylene, or those with up to 20 weight percent of one or more C4 to C20 α-olefins.

The low crystallinity propylene/ethylene random or block copolymer thermoplastic can be prepared by any suitable means. In general these thermoplastics have a crystallinity (measured by DSC) of less than 5%; preferably the crystallinity is below 2%. Low crystallinity propylene/ethylene random or block copolymer thermoplastic can be a random, or amorphous, polyolefin composition, based on propylene and ethylene, optionally based on 1-butene or, instead of the ethylene, as polymerized monomers or comonomers. The propylene content will preferably range from 60 weight percent, and above, to 85 weight percent, but below 90 weight percent. The low crystallinity propylene/ethylene random or block copolymer thermoplastic may have a number average molecular weight Mn (determined with SEC-DV (size exclusion chromatography, coupled with a differential viscosimetry) of at least 25,000. More preferably, the Mn of component the low crystallinity propylene/ethylene random or block copolymer thermoplastic is at least 50,000.

The cross-linked elastomer present in very soft TPV may be any natural or synthetic rubber which can be cured with known curatives, like peroxides, phenolic resins, maleimides or siloxane based curatives, with or without suitable co-curatives. Suitable rubbers according to the invention are essentially non-polar rubbers such as butyl rubber, or brominated or chlorinated isobutylene-isoprene rubber, styrene-butadiene rubber, natural rubber, ethylene/α-olefin (diene) rubber (EA(D)M-rubber), and polyisoprene rubber. Preference is given to ethylene/α-olefin/diene terpolymer (EADM) rubber and to butyl rubber. The EADM contains as the second monomer an α-olefin, which can be propylene, 1-butene, 1-pentene, 1-hexene, 1-octene and the like, or a branched isomer thereof like 4-methyl-1-pentene, and further styrene, α-methylstyrene and the like. Also mixtures of α-olefins are applicable. Preference is given to propylene and/or 1-butene as the α-olefin. Greater preference is given to propylene; the resulting terpolymer is an ethylene/propylene/diene terpolymer (EPDM). These polymers are well know in the art.

The third (or fourth, or higher) monomer in such an EADM or EPDM can be one or more of any conventionally used, non-conjugated, linear, branched or cyclic diolefin comonomer, such as, 1,4-hexadiene, dicyclopentadiene, ethylidenenorbornene, and vinylnorbornene. Ethylidenenorbornene and vinylnorbornene are preferred as a diolefin monomer.

Butyl rubber, which is a suitable cross-linkable elastomer of the thermoplastic elastomer of the present invention, is typically an amorphous copolymer of one or more isoolefins having from 4 to 7 carbon atoms, particularly, isobutylene and isoprene, and one or more vinyl aromatic monomer, particularly styrene, divinyl benzene, or para-alkylstyrene, such as para-methylstyrene. The term "butyl rubber" also comprises the halogenated form of the above-copolymers.

The processing oils are broadly construed as including any added oil, including "extender oils." As is well known, such oils are added to facilitate processing and to balance the overall end product properties. Rubber processing oils generally are polyisobutylene oil, paraffinic oil, naphthenic oil or other aromatic mineral oils derived from petroleum fractions. Oils derived from coal tar and pine tar can also be utilized. Synthetic organic esters, and similar plasticizers, are suitable as well, as are the low molecular weight synthetic polyolefin oils such as α-olefinic oils, e.g., poly-1-butene processing oil. It is generally desirable to use processing oils to improve processability by reducing viscosity and increasing melt flow. Adjusting TPV oil content may be useful to produce softer TPVs. For TPVs containing polyolefin rubbers, the preferred processing oils are paraffinic oil (such as Chevron 6001R), polyisobutylene oil, and naphthenic oil. The use of polyisobutylene oil may allow softer products when used in the same amount as paraffinic or naphthenic oil in a TPV formulation. Alternatively, a lower polyisobutylene oil level may allow the preparation of TPVs with equivalent hardness to TPVs containing a higher paraffinic or naphthenic oil level, thus allowing improved adhesion in overmolding, for the former TPVs.

Examples of polyisobutylene oils that are suitable for preparing the very soft TPVs are Indopols H100, H300, H1900, and H18,000, available from Innovene USA.

Having identified exemplary very soft TPV compositions, the adhesive thermoplastic elastomers (TPE's) of the present invention will now be further described.

In one embodiment, the adhesive TPE comprises a very soft TPV, and an unsaturated carboxylic acid functionalized thermoplastic resin. More specifically, the adhesive TPE composition of the invention may comprise from 80 to 60 weight percent of the very soft TPV, and from 20 to 40 weight percent in of unsaturated carboxylic acid functionalized thermoplastic resin. The thermoplastic resin of the unsaturated carboxylic acid functionalized thermoplastic resin may be a thermoplastic polyolefin resin and the unsaturated carboxylic acid may be acrylic acid or methacrylic acid.

In further embodiments, the adhesive TPE composition may comprise from 20 to 35 weight percent of unsaturated carboxylic acid functionalized thermoplastic resin and still further embodiments, from 20 to 30 weight percent of unsaturated carboxylic acid functionalized thermoplastic resin, and yet in further embodiments, from 20 to 25 weight percent of unsaturated carboxylic acid functionalized thermoplastic resin, and in still other embodiments from 25 to 40 weight percent of unsaturated carboxylic acid functionalized thermoplastic resin, or from 30 to 40 weight percent of unsaturated carboxylic acid functionalized thermoplastic resin, or from 35 to 40 weight percent of unsaturated carboxylic acid functionalized thermoplastic resin, or from 25 to 40 weight percent of unsaturated carboxylic acid functionalized thermoplastic resin, or from 30 to 35 weight percent of unsaturated carboxylic acid functionalized thermoplastic resin, wherein unsaturated carboxylic acid functionalized thermoplastic resin is an unsaturated carboxylic acid functionalized thermoplastic resin, and wherein all weight percents are with respect to the total adhesive TPV composition.

The unsaturated carboxylic acid functionalized thermoplastic resin may be a chemically modified thermoplastic resin containing reactive functional groups, preferably, unsaturated carboxylic acids, including methacrylic acid and acrylic acid. The unsaturated carboxylic acid functionalized thermoplastic resin may be selected from unsaturated carboxylic acid grafted C2 to C4 α-olefin homopolymers, unsaturated carboxylic acid grafted C2 to C20 α-olefin copolymers, copolymers of C2 to C4 α-olefins and unsaturated carboxylic acid, and blends thereof.

It is desirable that the unsaturated carboxylic acid functionalized thermoplastic resin comprises from 6 to 18 weight percent acid content, and preferably from 7 and 15 weight percent, and still more preferably from 7.5 to 10 weight percent acid content. Commercially available acrylic acid grafted thermoplastic resins include Polybond X52 B1, available from Chemtura Corporation. Commercially available ethylene/acrylic acid copolymers include Primacor 3460, available from the Dow Chemical Company. In another embodiment, the melt index (2.16 kg/190° C.) of the unsaturated carboxylic acid functionalized thermoplastic resin ranges from 10 to 500 g/10 min, and from 14 to 300 g/10 min in another embodiment.

All of the adhesive TPEs described herein may further contain conventional additives, which can be introduced into the composition in the thermoplastic resin, the rubber, or in the blend before, during or after the curing. Examples of such additives are antioxidants, antiblocking agents, antistatic agents, ultraviolet stabilizers, plasticizers (including esters), foaming agents, flame retardants and other processing aids known in the rubber compounding art. Such additives may comprise from 0.1 to 300 percent by weight based on the weight of rubber and thermoplastic resin in the final thermoplastic elastomer product. These additives are typically added in an amount of from 0 to 40 weight percent based upon the total compositions. Fillers, reinforcement, and extenders, which can be utilized, include conventional inorganics such as calcium carbonate, clays, silica, talc, titanium dioxide, carbon black, discontinuous fibers and the like. Additives, fillers or other compounds, which may interfere with the cure agents, should be added after curing reaches the desired level.

The process for preparing the thermoplastic elastomer can be any process by which a blend of the very soft TPV and a functionalized thermoplastic resin can be obtained. Equipment to be used in a process according to the invention can be any mixing apparatus for melt blending polymers. Suitable apparatus may include batch equipment (like Banbury mixers); however, preference is given to continuous operating equipment, such as an extruder, preferably a twin-screw extruder.

Soft, adhesive TPEs may also be formed by blending, in a one or two pass process, the constituent elements of the very soft TPV with the unsaturated carboxylic acid functionalized thermoplastic resin and optionally, additional processing oil.

A one pass process may comprise mixing the rubber, functionalized thermoplastic resin, low crystalline polymer (or other very soft TPV constituent), process oil, crosslinking agent, and cure catalyst or accelerator, where desirable to incorporate dynamic vulcanization technology (see, e.g., U.S. Pat. No. 4,594,390 and U.S. Pat. No. 6,147,160). "Dynamic vulcanization" means vulcanization or curing process for a rubber blended with thermoplastic resin, wherein the rubber is vulcanized under conditions of shear at a temperature sufficient for the mixture to flow. The rubber is thus simultaneously crosslinked and dispersed as micron-size particles within the thermoplastic resin. Depending on the degree of cure, rubber to plastic ratio, compatibility, type (kneader choice) and intensity of mixing (shear rate), other morphologies such as co-continuous rubber phase in plastic matrix are possible. The mixing and shear rate in the dynamic vulcanization can be accomplished by use of available plastic and rubber compounding equipment known in the art. The type and intensity of mixing, temperature, and residence time required for dynamic vulcanization can be achieved by the choice of one of the above machines in combination with the selection of kneading or mixing elements, screw design, and screw speed (typically <3000 RPM).

In a two pass process, a very soft TPV may be formed in the first and in the second pass, an the amount of the very soft TPV may be melt blended with the functionalized thermoplastic resin in the second pass, the functionalized thermoplastic being added either as pellets or in molten form.

The thermoplastic elastomers of the present invention may have a hardness of between 20 and 85 Shore A, and preferably between 20 and 75 Shore A, and more preferably between 35 and 65 Shore A and still more preferably between 45 and 65 Shore A. Hardness values of less than 65 may be achieved, and in other embodiments, less than 60, and in still other embodiments less than 55.

The thermoplastic elastomer composition of the present invention can be applied to a diverse range of substrates, though it is expressly contemplated that the TPVs of the present have good adhesion with respect to metal substrates. The metals may include ferrous metals, aluminum, stainless steel, tin, and other metal alloys. The substrates may include automotive parts, such as body panels. In one embodiment, an article is formed comprising the adhesive TPE and a metal substrate, wherein the surface of the metal being contacted is not chemically or physically pretreated. In another embodiment, the metal substrate is at a temperature of less than 50° C., preferably less than 45° C. when contacted with the adhesive TPE.

The present invention therefore further includes articles comprising a metal substrate in combination with one or more layers or connections which are formed, in whole or in part, from the present soft, adhesive TPE compositions. The substrate can be covered in whole or in part with one or more layers. Such articles may include drill handles, automobile parts, and the like.

In support of the compositions and methods of the present invention, the following Examples are offered.

TABLE 1

| Very Soft TPV Bases | | | |
|---|---|---|---|
| Composition | ASB1 | ASB2 | Santoprene 8211-35[9] |
| VX1696[1] | 200 | 200 | |
| Icecap k Clay[2] | 12.0 | 12.0 | |
| ZnO[3] | 2.00 | 2.00 | |
| Softel CA 02A[4] | 35.0 | 35.0 | |
| DC 2-5084[5] | 3.00 | 3.00 | |
| Pt (0.22 wt % PC085 in paraffinic oil)[6] | 3.00 | 3.00 | |
| Chevron 600 1 R[7] | 82.0 | — | |
| Indopol H300[8] | — | 50.0 | |
| properties | | | |
| Hardness (Shore A) | 21 | 34 | 35 |
| Ultimate Tensile Strength (psi) | 332 | 627 | 450 |
| Ultimate Elongation (%) | 357 | 511 | 450 |
| Tension Set (%) | 4 | 2 | 5 |

[1]ExxonMobil Chemical Co.—EP(VNB)DM, ethylene 63%, propylene 36.3%, 0.7% VNB, by weight, preblended with 100 phr Chevron 6001R paraffinic oil.
[2]Burgess calcined clay.
[3]Heat stabilizer.
[4]Softel CA 02A Composition: 73 wt % Ethylene/propylene rubber (26 wt % E, Mw = 367K, Mn = 66.6K), 11 wt % Ethylene/propylene rubber (32 wt % E, Mw = 377K, Mn = 52.5K), 3 wt % Ethylene/propylene (4 wt % propylene), 2.4 wt % ethylene/propylene (7 wt % propylene), 7.0 wt % random PP (3 wt % E, m.p. 148 degree C.), 3.6 wt % random PP (6 wt % E).
[5]Dow Corning—Trimethylsilyloxy terminated polymethylhydrogensiloxane-co-methyl n-octylsiloxane (DP = 18).
[6]United Chemical Technologies—~2.2 wt % Pt in $D_4$ methylvinylsiloxanes, diluted in paraffinic oil.
[7]Paraffinic oil.
[8]Polyisobutylene oil, Innovene USA
[9]Advanced Elastomer Systems, Inc.—EP(VNB)DM, homopolypropylene, paraffinic oil; 35 Shore A hardness.

Table 1 provides the compositions of two exemplary very soft TPV bases (ASB1 and ASB2 respectively) suitable for use in accordance with the present invention. The difference between ASB1 and ASB2 concerns the type and amount of process oil in the composition. In ASB1, the composition includes 182 phr of paraffinic oil. Of the 182 phr of paraffinic oil, 100 phr is contributed by the elastomer VX1696 and 82 phr of additional paraffinic oil was added. In contrast, in ASB2, the composition includes 100 phr of paraffinic oil contributed by the elastomer VX1696 and 50 phr of polyisobutylene oil.

The physical property data contained in Table 1 demonstrates that the very soft TPV base ASB2, having polyisobutylene oil, had improved physical properties (tensile strength, elongation, tension set) compared to ASB1 comprising only paraffinic oil as the process oil. Thus, it may be preferable to use a very soft TPE base having polyisobutylene oil in the composition, in the metal bondable TPEs of the present invention, in order to improve physical properties.

For comparative purposes, physical property data of a commercially available 35 Shore A hardness EP(VNB)DM, homopolypropylene TPV (Santoprene 8211-35) is also provided in Table 1. ASB2 shows improved physical properties to the commercially available TPV.

TABLE 2

Metal Bondable Thermoplastic Elastomer Compositions

| Composition (wt %) | Sample 1 | Sample 2 | Sample 3 |
|---|---|---|---|
| ASB1 | 70.0 | 70.0 | 70.0 |
| Primacor 3460[10] | 30.0 | — | — |
| Primacor resin[11] | — | 30.0 | — |
| Primacor 1321[12] | — | — | 30.0 |
| properties | | | |
| Hardness (Shore A) | 57 | 56 | 62 |
| UTS (psi) | 576 | 482 | 767 |
| UE (%) | 373 | 297 | 429 |
| CS (%, 70° C., 22 hrs.) | 65 | 59 | 58 |
| TS (%) | 11 | 10 | 12 |
| Tear Die C (pli) | 90 | 77 | 116 |
| Adhesion Al (pli)[13] | 14/14 | 11/12 | No Bond |

[10]Dow Chemical—ethylene/acrylic acid copolymer, 9.7 wt. % acrylic acid, 20 MI
[11]Dow Chemical—ethylene/acrylic acid copolymer, 17 wt. % acrylic acid, 240 MI
[12]Dow Chemical—ethylene/acrylic acid copolymer, 6.5 wt. % acrylic acid, 2.6 MI
[13]Peel strength to aluminum after aging 1 week in water at room temperature.

Table 2 demonstrates the adhesion that can be achieved to metal (aluminum) substrates with the TPVs of the present invention. It is further demonstrated that the use of an acid grafted thermoplastic having an acid content greater than 6.5 weight percent and less than 17 weight percent, and more specifically having 9.7 weight percent acrylic acid showed the most effective adhesion to the aluminum substrate.

Sample adhesive TPEs 1, 2 and 3 of Example 1 were formed in a two-pass process. In the first pass, very soft TPV base (ASB1 from Table 1), was formed. Sample TPVs 1, 2, and 3 were then formed in a second pass by melt blending 70 parts of the very soft TPV base ASB1 with 30 parts of an ethylene acrylic acid copolymer having 9.7 weight percent acrylic acid content (Sample 1), 17 weight percent acrylic acid content (Sample 2), and 6.5 weight percent acrylic acid content (Sample 3). The equipment used was a 53 mm co-rotating and intermeshing twin screw extruder (TSE) with 12 barrel sections. A melt gear pump was used to feed the product past the TSE die and into an underwater pelletizer for product finishing.

For adhesion testing, a degreased 1"×2.5"×0.065" aluminum coupon was heated to 120° C., and then inserted into a mold at 40° C. An 0.05" thick layer of the metal bondable TPE (melt temperature 240° C.) was then injection overmolded on to the aluminum coupon that was partially covered with Teflon tape at one end. Thus the overmolded adhesive TPE layer could be partially peeled back from the metal substrate, and a 90° peel test for adhesion could be performed with the metal coupon being clamped horizontally along the thin edge. The adhesive TPE was pulled at 2"/min, until it was almost separated from the metal, and an average adhesion force per linear inch width of the adhesive TPE was determined.

In all cases, the average peel value over three samples was recorded. Samples were also tested after aging and deionized water for one week at room temperature. Aged samples were dried over night at room temperature before testing.

As shown in Table 2, all of the Sample TPEs had the desirable hardness of between 55 and 75 Shore A. TPE Sample 3, having a functionalized thermoplastic with 6.5 weight percent acid content showed no bonding to the aluminum substrate. This suggests a lower limit on the acid content of the functionalized thermoplastic, including perhaps a lower limit to the material melt index (2.6 MI @190° C. and 2.16 kg load), which is an indicator of substrate wetability by the molten adhesive TPE. TPV Sample 2, using a 17 weight percent acid functionalized thermoplastic showed some adhesion to the aluminum substrate; however, adhesion was improved with use of the 9.7 weight percent acid functionalized thermoplastic, without adversely affecting material properties. The adhesive strength of Sample 2 to aluminum was poorer than that of Sample 1, in spite of the high acid content in the former sample, perhaps due to incompatibility of this acid functionalized resin (high acid content) with the rest of the TPV matrix.

Dog-bones were cut out of the molded (aged at room temperature for 24 hr.) plaque for tensile testing (0.16" width, 1.1" test length (not including tabs at end)). The tension set specimens were 0.1" wide, with a 2" test length (not including tabs at end). Tension set was measured at room temperature by holding the specimens in a jig at 100% elongation for 10 min., and then allowing the unloaded test specimen to relax for 10 min., before measuring "set". For compression set measurement, 6-7 buttons (0.75" dia.) were cut from injection molded plaques, stacked, and compressed 25% in a jig before heating to the test temperature. At the end of the test period, the hot buttons were recovered from the jig and cooled for 0.5 hr. in air before measuring the "set" taken by the sample.

Thus, one embodiment of the invention is directed to an adhesive thermoplastic elastomer composition comprising: a very soft TPV possessing a hardness of less than 45 Shore A; and an unsaturated carboxylic acid functionalized thermoplastic resin selected from the group consisting of unsaturated carboxylic acid grafted C2 to C4 α-olefin homopolymers, unsaturated carboxylic acid grafted C2 to C20 α-olefin copolymers, copolymers of C2 to C4 α-olefins and unsaturated carboxylic acid, and blends thereof.

The adhesive thermoplastic elastomer composition of the above embodiment, wherein the various components are as follows:
  (a) from 60 to 80 weight percent of a very soft TPV comprising
    (i) from 2 to 10 weight percent, based upon total very soft TPV of a thermoplastic resin;
    (ii) from 2 to 50 weight percent, based upon total soft TPV of a thermoplastic propylene/ethylene random or block copolymer;
    (iii) from 45 to 96 weight percent, based upon total soft TPV of a cross-linked elastomer; and
    (iv) from 100 to 225 phr of process oil; and
  (b) from 40 to 20 weight percent of an unsaturated carboxylic acid functionalized thermoplastic resin based on the weight of the thermoplastic elastomer composition, wherein the thermoplastic resin of the unsaturated carboxylic acid functionalized thermoplastic resin is a thermoplastic polyolefin resin, and, wherein the unsaturated carboxylic acid is acrylic acid or methacrylic acid.

The adhesive thermoplastic elastomer composition of any one of the preceding embodiments above, wherein the TPE base has a hardness of less than 35 Shore A.

The adhesive thermoplastic elastomer composition of any one of the preceding embodiments above, wherein the unsaturated carboxylic acid functionalized thermoplastic resin is a copolymer of C2 to C4 α-olefins and unsaturated carboxylic acid, and wherein the unsaturated carboxylic acid is acrylic acid.

The adhesive thermoplastic elastomer composition of any one of the preceding embodiments above, wherein the unsaturated carboxylic acid functionalized thermoplastic resin is a copolymer of ethylene and acrylic acid having an acrylic acid content of between 6 and 15 weight percent.

An article formed by adhearing the adhesive thermoplastic elastomer composition of any one of the preceding embodiment and a metal substrate to one another. In another embodiment, the metal substrate is at a temperature of less than 50° C. In yet another embodiment, the metal substrate has not been chemically or physically pretreated.

We claim:

1. An adhesive thermoplastic elastomer composition comprising:
   (a) from 60 to 80 weight percent, based on the weight of the adhesive thermoplastic elastomer, of a TPV having a Shore A hardness of less than 45 and comprising
      (i) from 2 to 10 weight percent, based upon the TPV, of a thermoplastic resin;
      (ii) from 2 to 50 weight percent, based upon the TPV, of a thermoplastic propylene/ethylene random or block copolymer;
      (iii) from 45 to 96 weight percent, based upon the TPV, of a cross-linked elastomer; and
      (iv) from 100 to 225 phr of process oil; and
   (b) from 40 to 20 weight percent, based on the weight of the adhesive thermoplastic elastomer, of an unsaturated carboxylic acid functionalized thermoplastic resin, wherein the thermoplastic resin of the unsaturated carboxylic acid functionalized thermoplastic resin is a thermoplastic polyolefin resin, and, wherein the unsaturated carboxylic acid is acrylic acid or methacrylic acid; wherein the carboxylic acid content of the functionalized thermoplastic resin is greater than 6.5 wt % but less than 17 wt %, based on the weight of the functionalized thermoplastic resin.

2. The thermoplastic elastomer composition of claim 1, wherein the thermoplastic resin of (a) is selected from the group consisting of polyethylene homopolymers, polypropylene homopolymers, ethylene-propylene copolymers, copolymers comprising ethylene or propylene together with one or more $C_4$ to $C_{20}$ α-olefins, and blends thereof.

3. The thermoplastic elastomer of claim 1, wherein the acrylic acid content is between 7 and 10 weight percent.

4. The thermoplastic elastomer composition of claim 1, wherein the cross-linked elastomer is ethylene/α-olefin (diene) rubber.

5. The thermoplastic elastomer composition of claim 1, having a Shore A Hardness of less than 75.

6. The thermoplastic elastomer composition of claim 1, having a Shore A Hardness of less than 60.

7. An article formed by adhering the adhesive thermoplastic elastomer composition of claim 1 and a metal substrate to one another.

8. The article of claim 7, wherein the metal substrate is at a temperature of less than 50° C.

9. The article of claim 7, wherein the metal substrate has not been chemically or physically pretreated.

10. The article of claim 1, where the unsaturated carboxylic acid functionalized thermoplastic polyolefin resin is an acrylic acid or methacrylic acid grafted C2 to C4 α-olefin homopolymer, acrylic acid or methacrylic acid grafted C2 to C20 α-olefin copolymer, a copolymer of C2 to C4 α-olefins and acrylic acid or methacrylic acid, or a blend thereof.

11. The article of claim 1, where the unsaturated carboxylic acid functionalized thermoplastic polyolefin resin is an acrylic acid or methacrylic acid grafted C2 to C4 α-olefin homopolymer.

12. The article of claim 1, where the unsaturated carboxylic acid functionalized thermoplastic polyolefin resin is an acrylic acid or methacrylic acid grafted C2 to C20 α-olefin copolymer.

13. The article of claim 1, where the unsaturated carboxylic acid functionalized thermoplastic polyolefin resin is a copolymer of C2 to C4 α-olefins and acrylic acid or methacrylic acid.

14. The article of claim 1, where the unsaturated carboxylic acid functionalized thermoplastic polyolefin resin is an ethylene/acrylic acid copolymer.

15. A composition consisting essentially of:
   (a) a TPV having a Shore A hardness of less than 45 and consisting essentially of:
      (i) a crosslinked ethylene-propylene-diene elastomer;
      (ii) polypropylene;
      (iii) ethylene-propylene rubber and an ethylene-propylene thermoplastic resin;
      (iv) paraffinic oil or polyisobutylene oil;
      (v) clay; and
      (vi) zinc oxide; and
   (b) an ethylene/acrylic acid copolymer having 6 to 18 wt% acid content, based on the weight of the ethylene/acrylic acid copolymer.

16. The composition of claim 15, where the elastomer is crosslinked with a siloxane curative.

17. The composition of claim 16, where the diene of the elastomer includes vinylnorbornene.

* * * * *